United States Patent [19]
Padden

[11] Patent Number: 5,224,670
[45] Date of Patent: Jul. 6, 1993

[54] COMPOSITE FOCUSED LOAD CONTROL SURFACE

[75] Inventor: Vincent T. Padden, Brightwaters, N.Y.

[73] Assignee: Grumman Aerospace Corporation, Bethpage, N.Y.

[21] Appl. No.: 759,231

[22] Filed: Sep. 13, 1991

[51] Int. Cl.⁵ .............................................. B64C 1/26
[52] U.S. Cl. .................................... 244/123; 244/213
[58] Field of Search ................... 244/117 R, 119, 213, 244/214, 215, 131, 132, 133, 123; 52/806

[56] References Cited

U.S. PATENT DOCUMENTS

| | | | |
|---|---|---|---|
| 3,140,066 | 7/1964 | Sutton et al. | 244/215 |
| 3,768,760 | 10/1973 | Jensen | 244/123 |
| 4,304,376 | 12/1981 | Hilton | 244/123 |
| 4,533,098 | 8/1985 | Bonini et al. | 244/213 |
| 4,784,355 | 11/1988 | Brine | 244/213 |

FOREIGN PATENT DOCUMENTS 3530862  3/1987  Fed. Rep. of Germany ...... 244/213

OTHER PUBLICATIONS

"Advanced Composite Structures", Rockwell Int. Brochure 1978.
"Superplastic Forming/Diffusion Bonding", Rockwell Int. Brochure, 1978.

Primary Examiner—Galen Barefoot
Attorney, Agent, or Firm—Bacon & Thomas

[57] ABSTRACT

A graphite epoxy spoiler for an aircraft wing is manufactured by estimating the shear force to which the spoiler will be subject, and forming a fitting attachment surface and fitting designed to eliminate a separate shear attachment between the spoiler structure and the center attachment/drive fitting. This permits use of a one piece co-cured honeycomb sandwich construction for the spoiler.

24 Claims, 7 Drawing Sheets

COMPOSITE FOCUSED LOAD CONTROL SURFACE

BACKGROUND OF THE INVENTION

1. Field of the Invention

This invention relates to the manufacture of composite load bearing structures, and in particular to the manufacture of an aircraft wing spoiler of honeycomb sandwich construction. The invention also relates to a design configuration for composite load bearing structures in general and in particular to a design configuration for an aircraft wing spoiler of honeycomb sandwich construction.

2. Description of Related Art

Because of the weight savings offered by advanced composite materials, especially epoxy graphite, and the resulting improvements in performance, modern aircraft have become increasingly reliant on such materials. The F-16 was the first military aircraft to use graphite epoxy structures in production, and the technology has advanced to the point where many aircraft, such as the F-18, use graphite composites extensively, in applications ranging up to 26% of the aircraft's structural weight. Future military aircraft designs are projected to include as much as 40-50% of their structural weight in advanced composites.

The commercial and general aviation industries have also utilized advanced composite technology, in conventional transport aircraft, the resulting weight savings providing significant increases in payload and consequent decreases in fuel consumption. Advanced composites have already been certified by the FAA for secondary structural (not critical to flight safety) components, and transport aircraft have been designed with advanced composite secondary structures including fairings, control surfaces, and the like.

A disadvantage of the graphite epoxy control surface, however, is that the cost to weight ratio is relatively high in comparison with metals such as aluminum. The reason for the high cost is that structural requirements for graphite epoxy control surfaces currently necessitate a concentration of graphite material piles and, in many configurations, the use of multiple pre-cured parts in order to provide spars and other structural elements necessary to accommodate fitting attachments. Construction of control surfaces having a large number of graphite material piles and pre-cured parts requires multiple curing cycles in the autoclave, greatly increasing manufacturing time and costs.

FIG. 1 is an exploded view of a current graphite epoxy spoiler design for a transport aircraft. The spoiler 10 is a special form of control surface which is located on the upper surface of the trailing edge of the wing 11 as shown in FIG. 3a, and which deflects upward from flaps 12 under pilot command in order to provide roll control and braking functions. The principal load on the spoiler when the spoiler is extended is therefore a shear force resulting from the airstream at the top of the wing which is normal to the spoiler when the spoiler is in its operative position.

The current design utilizes a honeycomb sandwich core construction, and requires six pieces, not including the three attachment fittings. The six pieces include respective pre-cured upper and lower covers 1 and 2, a pre-cured spar 3 for providing shear attachment of mounting fittings 4–6 to the control surface, and pre-cured closure ribs 7 and 8 which enclose the honeycomb core 9. In order to construct this type of spoiler, the various parts are separately pre-cured and then bonded together to form the spoiler assembly. The mounting fittings 4–6 are then attached to spar 3. The mounting hardware defines three hinge apertures 11–13 and an aperture 14 for attaching an actuator control rod.

This design, while structurally and aerodynamically acceptable, suffers from high manufacturing costs due to the relatively large number of graphite plies and curing steps to form the final assembly.

SUMMARY OF THE INVENTION

In view of the above-described disadvantages of current designs, it is an objective of the invention to reduce costs by providing a method of manufacturing a load-bearing structure subjected during use to shear forces, but which eliminates the need for a direct shear attachment of the structure's mounting fittings to the surface of the structure.

It is a second objective of the invention to reduce costs by providing an advanced composite control surface subjected during use to shear forces and which would conventionally require a multiple part construction, but which is instead a co-cured one piece assembly.

It is a third objective of the invention to provide a method of manufacturing an aircraft spoiler assembly which does not require a direct shear attachment of the spoiler actuator mounting fitting to the spoiler's control surface.

It is a fourth objective of the invention to provide a method of manufacturing an advanced composite aircraft control surface, and in particular a graphite epoxy control surface, which eliminates the need for a multi-step curing process employing multiple pre-cured pieces.

These objectives are accomplished by providing a co-cured one piece assembly in which the attachment fitting of the assembly's control surface is caused to converge at the focus of the applied loads on the attachment fitting. This eliminates the need for direct shear attachment of the hinge/actuator drive fitting to the control surface because the shear load is carried as a component of the axial load at the fitting attachment surface.

As a result of the inventive design, it is possible to provide graphite epoxy construction of aircraft control surfaces which is competitive in cost with traditional aluminum construction. This approach allows for a less complicated graphite structure around the main attachment fitting because no vertical shear attachment is required between the attachment fitting and the bonded graphite panel, and thus a separate pre-cured forward spar on the control surface is not required. Attachment fitting complexity is also reduced using the inventive focused load concept because less fasteners are required along with a smaller fitting.

In a particularly preferred embodiment of the invention, a center attachment fitting for an aircraft spoiler is provided with a center spoiler hinge point and drive actuator attachment point. The core of the spoiler includes a one-piece co-cured honeycomb sandwich construction with an integral front spar supported on the wing by two hinge fittings and a center actuator drive fitting. The spoiler is driven by one mid-span hinge/actuator connected to a single hinge/actuator drive fitting which is designed such that the transverse shear is reacted by a component of the axial force in the lower cover at the hinge/actuator drive fitting. The inboard fitting is a link fitting used to uncouple wing and spoiler strong axis bending. The outboard fitting has a pivot line normal to the hinge line to eliminate side loads. All side loads are reacted at the center hinge/actuator fitting.

Focusing of the applied loads is accomplished by causing an extension or tangent of the lower cover fitting attachment flange to converge at a focus point on the upper cover to form an angle of load convergence selected to cause the resulting structure to function as an integral unit or "truss."

According to the preferred method of manufacture, therefore, the above spoiler, including a composite load bearing surface of honeycomb sandwich construction, is formed as a one piece co-cured assembly by first predicting the shear forces to which the control surface will be subject, and then forming the lower fitting attachment flange such that an extension thereof converges on the upper surface at the focus point of the predicted shear forces.

In an especially advantageous embodiment of the invention, the integral spar is at an angle of approximately forty-five degrees to allow the lower cover to drape completely over the entire core.

DETAILED DESCRIPTION OF THE PREFERRED EMBODIMENTS

Figure 1:
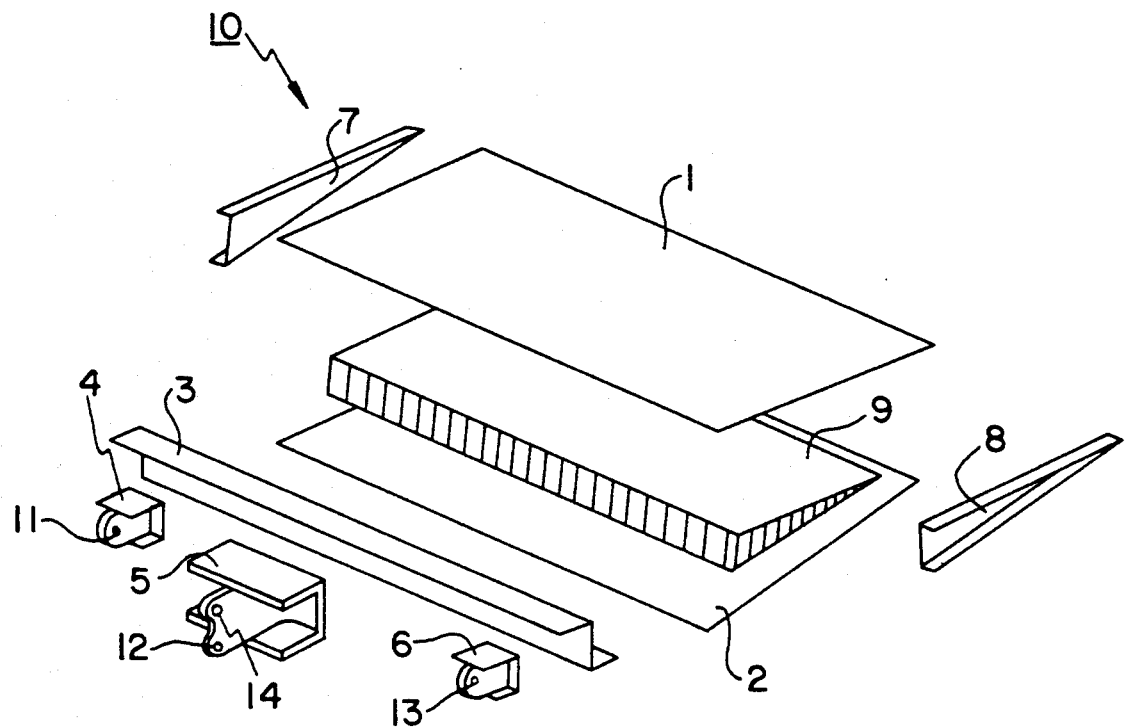
FIG. 1 is an exploded perspective view of a current spoiler design.
Figure 2:
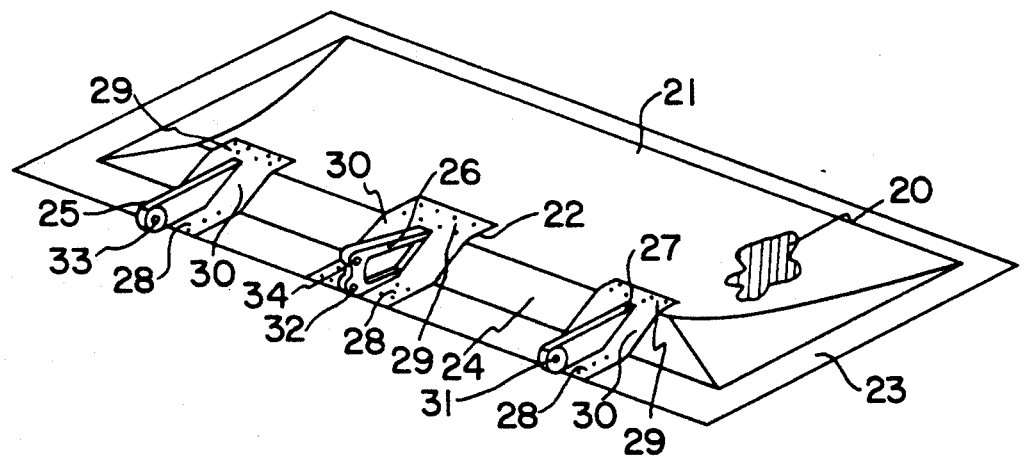
FIG. 2 is a perspective view of a one-piece co-cured spoiler design having an integral front spar according to a preferred embodiment of the invention.
Figure 3A:
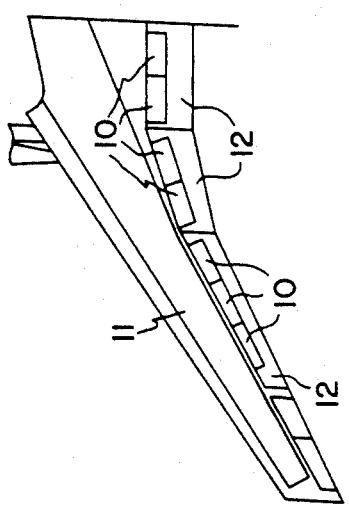
FIG. 3(a) is a top view of an aircraft wing showing the location of spoilers of the type illustrated in FIGS. 1-3(a).
Figure 3B:
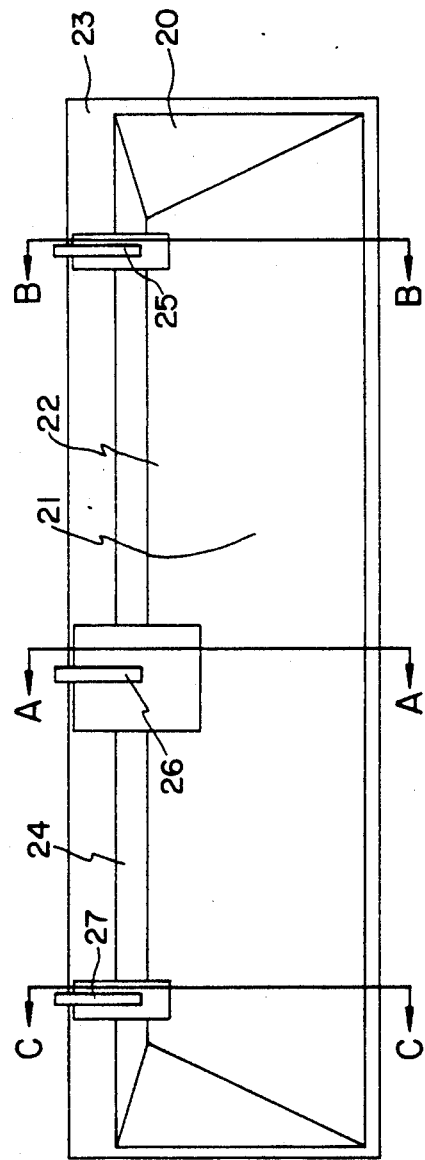
FIG. 3(b) is a top view of the preferred spoiler of FIG. 2.
Figure 4:
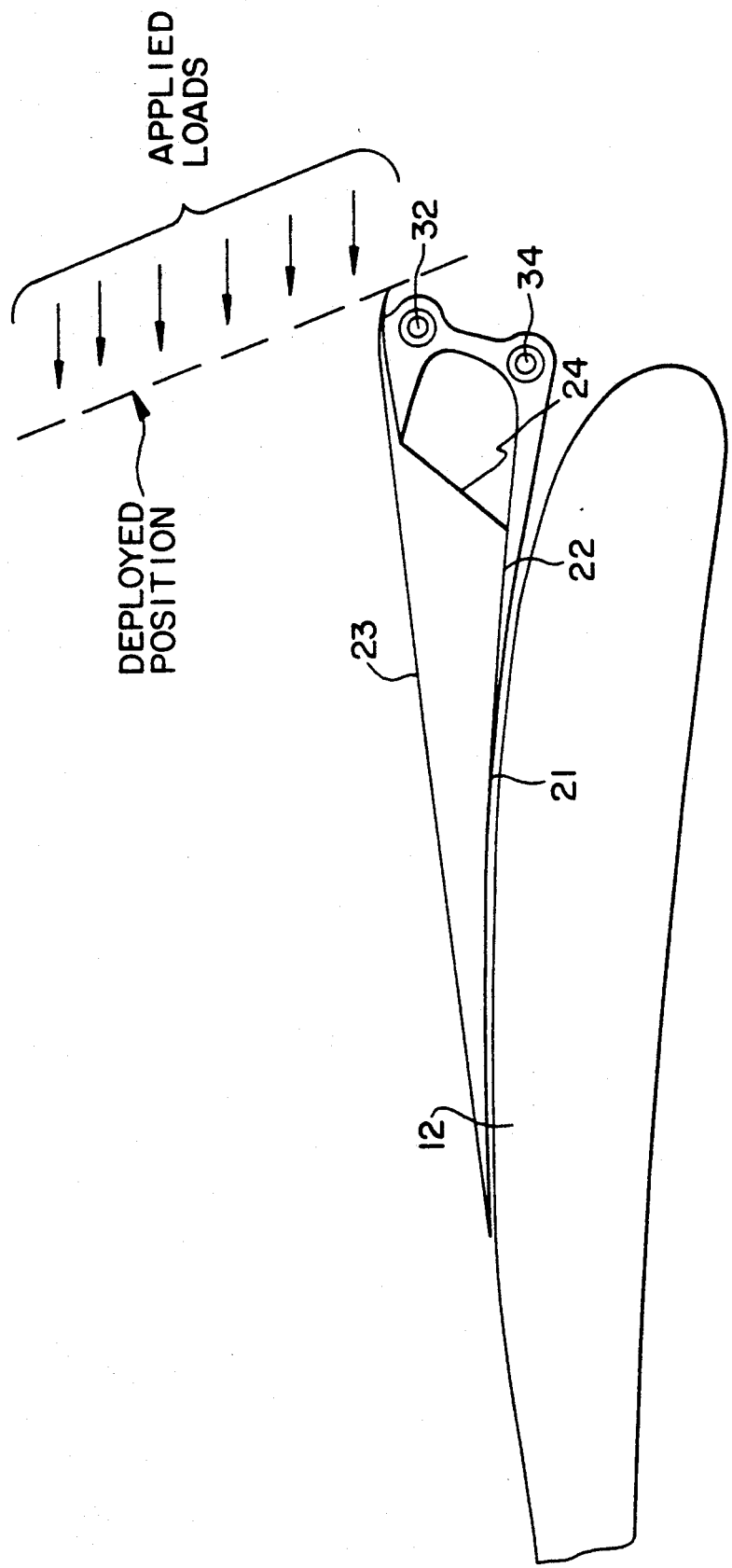
FIG. 4 is a cross-sectional side view of the preferred spoiler taken along line A—A in FIG. 3(b).
Figure 5:
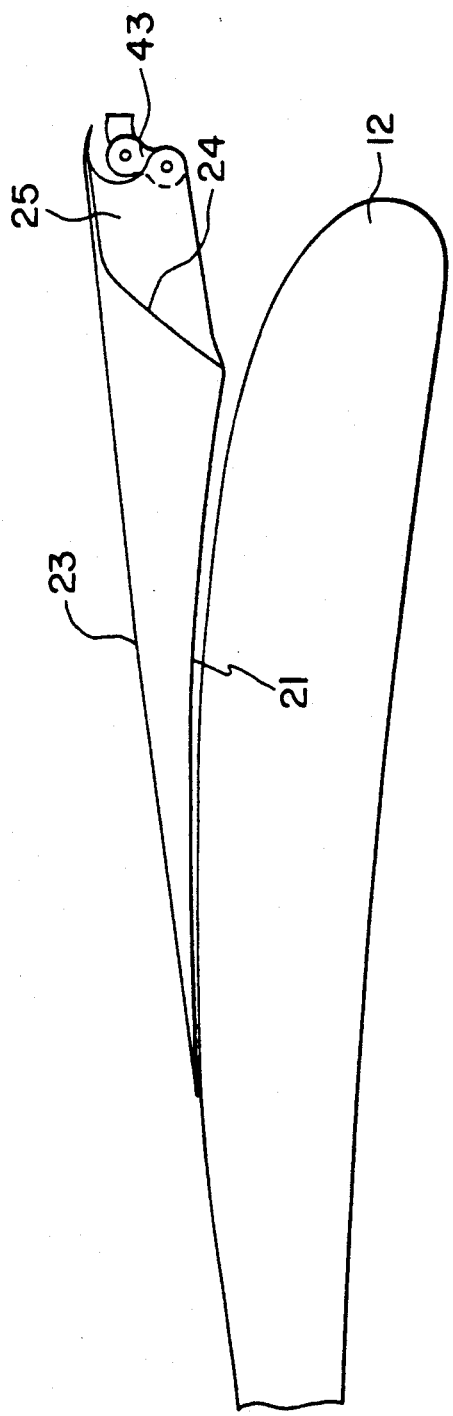
FIG. 5 is a side view of the preferred spoiler taken along line B—B in FIG. 3.
Figure 6:
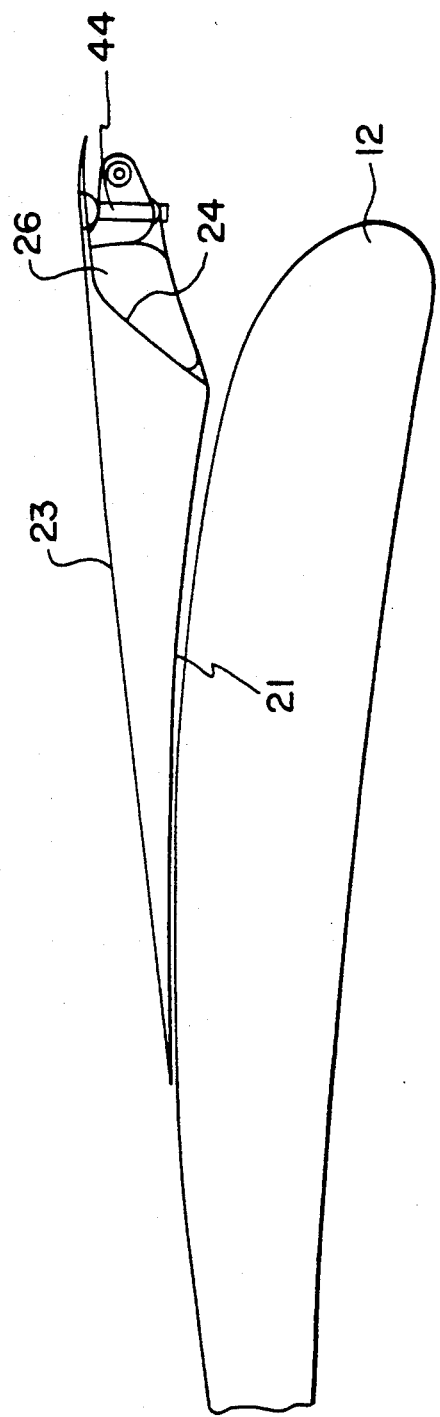
FIG. 6 is a side view of the preferred spoiler taken along line C—C in FIG. 3.

FIGS. 2-6 show a one piece co-cured spoiler structure constructed according to the principles of a preferred embodiment of the invention. FIGS. 1, 2, and 3(b) are shown in inverted position so that the lower cover is depicted as facing up for clarity.

The preferred spoiler, as shown in FIG. 2, is made up of a honeycomb core 20, a lower surface 21 including a hinge attachment area 22, an upper surface 23, and an integral front spar 24. The spoiler is attached to the wing by hinge fittings 25 and 26 and by an hinge/actuator drive fitting 27. Each of the attachment fittings includes mounting surfaces or flanges 28 and 29 and an intermediate surface 30. The fittings also include hinge attachment apertures 31-33 and actuator attachment aperture 34 similar to respective apertures 11-14 of the conventional spoiler design. Flange 29 and surface 21 form an angle determined by a line extending from the flange to the location of the focal point of the predicted shear force on the control surface when the spoiler is extended, as will be described in detail below.

The preferred material for the spoiler is an advanced composite material such as graphite epoxy while the material for all hinge fittings is preferably aluminum. However, it will be appreciated that the invention is not intended to be limited to a particular material for either the fittings or the spoiler itself. In the case of a graphite epoxy spoiler with aluminum fittings, all aluminum parts are preferably isolated from the graphite epoxy using a fiberglass isolation ply.

Construction of the spoiler employs the previously mentioned, co-cured molding process and the focused load concept to minimize weight, part bonding costs, and assembly costs, including minimizing the costs of hole drilling, fastener insulation, fit up, and shimming. Use of a co-cured molding process is possible because the design of the spoiler reduces complexity of the center hinge/actuator drive fitting attachment points. The upper and lower cover design utilizes tape and fabric carbon epoxy while the edges of the spoiler are preferably thickened to resist handling damage. Preferably, the integral spar is at forty-five degrees, as shown, to permit the lower cover to drape completely over the entire spar.

The core may be in the form of a Nomex honeycomb, or a similar advanced composite honeycomb construction. The bonded spoiler assemblies are mechanically assembled to the aluminum hinge fittings using flush bolt and nuts through the upper cover and, by way of example, blind Composi-loks for the connections through the lower cover and integral spar.

Figure 7:
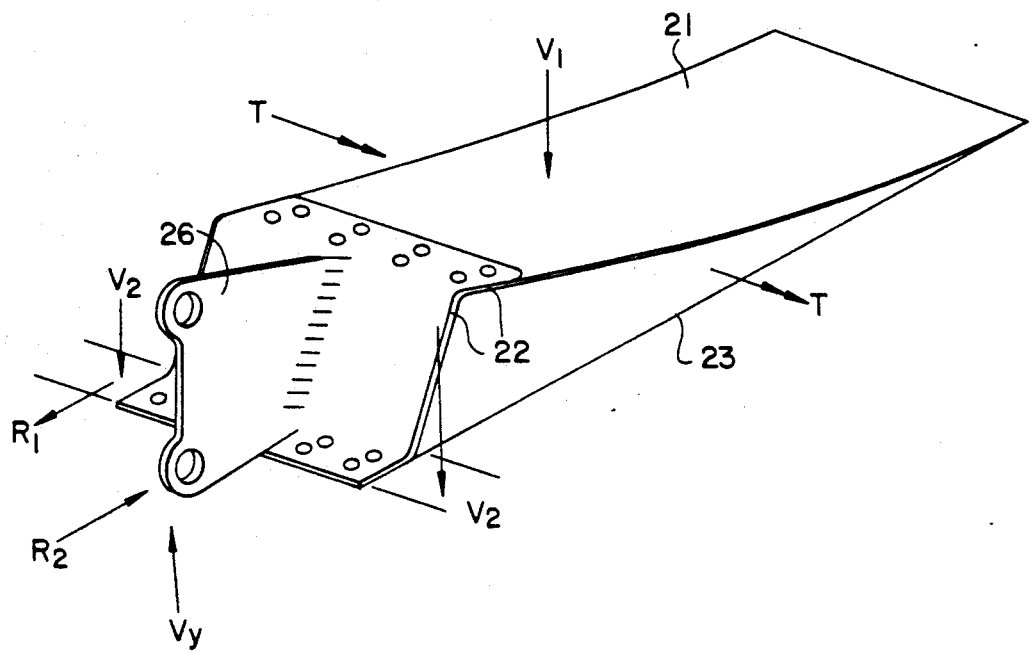
FIG. 7 is a perspective view illustrating the applied loads to the preferred spoiler hinge/actuator drive fitting.
Figure 8:
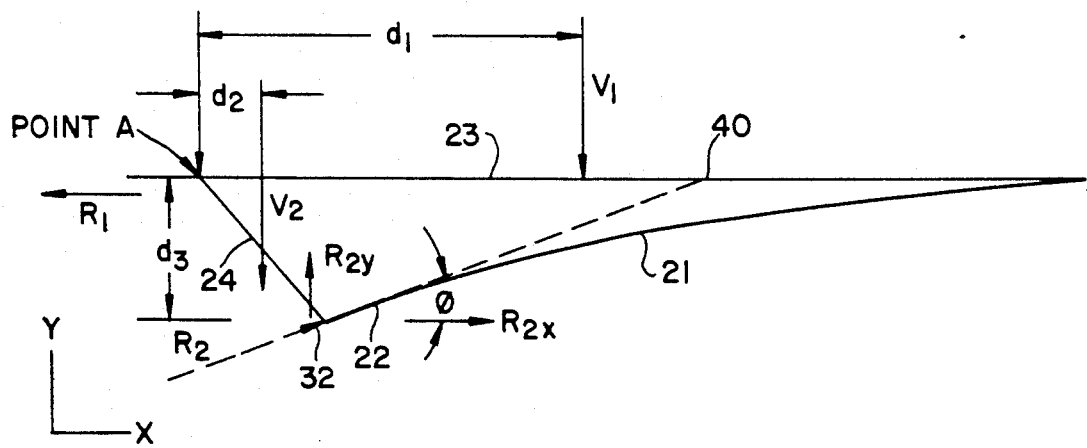
FIG. 8 is a schematic diagram further illustrating the geometry of the applied loads to the preferred hinge/actuator drive.

This simple construction, using well-known curing techniques, is made possible through the use of an attachment flange geometry which eliminates a shear attachment on the hinge/actuator drive fitting, as follows:

Referring to FIGS. 7 and 8, which shows a section of the spoiler at the hinge/actuator drive fitting 27, it is initially noted that the spoiler loads may be represented as shear force $V_1$ and $2V_2$ and opposing coupling forces $R_1$ and $R_2$. Force $R_1$ is provided by the actuator and is opposed by the parallel or horizontal hinge coupling force component $R_{2x}$ of $R_2$. The shear force $V_1$ and $2V_2$ is opposed by the transverse or vertical component $R_{2y}$ of hinge coupling force $R_2$.

The scalar sum of all forces on the fitting in the X direction is therefore simply the sum of $R_1$ and $R_{2x}$, i.e.:

$$\Sigma F_x = -R_1 + R_{2x} = 0 \quad (1)$$

The scalar sum of the vertical or Y direction forces is $$\Sigma F_y = -V_1 + R_{2y} = 0 \quad (2)$$

At the hinge attachment point 32, the shear force $V_y$ actually has two components, the first component $V_1$ being the aerodynamic force on the lower cover as shown in FIG. 7. The second component $V_2$ of shear force $V_r$ is distributed over the spar 24. Thus, $\Sigma V = V_1 + 2V_2$, while $$\Sigma F_y = R_{2y} - V_1 - 2V_2 = 0 \tag{3}$$

$\Sigma$ Fy is set to zero because the system is effectively static when in operation, and is preferably determined at the maximum load to which the spoiler will be subject for all flight and ground modes.

In FIG. 8, the scalar sum of the moments acting about point A is therefore given by the sum of the products of the respective unconstrained forces $R_{2x}$, $R_{2y}$, $V_1$ and $V_2$ and their respective distances to point A, $d_3$, $2d_2$, $d_1$, and $d_2$ (one half the spar depth), with the addition of a torsion T caused by air loads on the remaining spoiler surface adjacent to the hinge/actuator area. This sum is set to zero about point A, as follows:

$$2V_2 d_2 + V_1 d_1 + T - R_{2y}(2d_2) - R_{2x}(d_3) = 0 \tag{4}$$

As is apparent from FIG. 8, the relative magnitudes of the coupling forces $R_{2x}$ and $R_{2y}$, which are the reactive forces on the hinge opposed to actuator coupling force $R_1$, are determined by the shape of the fitting, and thus by the angle between attachment flange 22 and the X axis or horizontal direction defined by the lower cover. In order to eliminate the shear force on the hinge fitting therefore, it is simply necessary to specify $\theta$ in a manner which satisfies the initial condition given by equation (4).

Since $$\theta = \arctan \frac{R_{2y}}{R_{2x}} \tag{5}$$

$$R_{2x} = 2V_2 \left( \frac{d_2}{d_3} \right) + V_1 \left( \frac{d_1}{d_3} \right) + \frac{T}{d_3} - R_{2y} \left( \frac{d_2}{d_3} \right) \tag{6}$$

and $$R_{2y} = V_1 + 2V_2. \tag{7}$$

then $$\tan\theta = \frac{V_1 + 2V_2}{V_1 \frac{d_1}{d_3} + \frac{T}{d_3} - 2(V_1 + 2V_2)\left(\frac{d_2}{d_3}\right)} \tag{8}$$

Equations 6 and 7 are solutions of equations 4 and 3, respectively, in terms of $R_{2x}$ and $R_{2y}$, $\theta$ can thus be defined solely in terms of predictable shear forces acting on the spoiler and the spoiler geometry. For loading conditions where the pressure load distribution on the control surface varies, the determination of the distance to the focal point ($d_1$), would be based on a weighted average loading condition and location of the center of pressure. Moments produced by shear forces not located on the focus would be reacted by vertical forces on the fitting flanges. Under normal conditions these forces would be small and considered as a secondary effect in the design.

Once the angle of the attachment surface is defined, the hinge/actuator drive fitting 27's inner surface flange is designed to match the angle. In addition inboard fitting 25 includes a slotted pivot 3 perpendicular to the hinge line which uncouples the spoiler and wing strong axis bending, while in the spoiler deplayed condition after bending the outboard fitting 26 has a pivot line 44 normal to the hinge line to eliminate side loads so that all side loads are reacted at the center hinge/actuator fitting 27, as was assumed in the calculations used to obtain the geometry of fitting 27.

Figure 9:
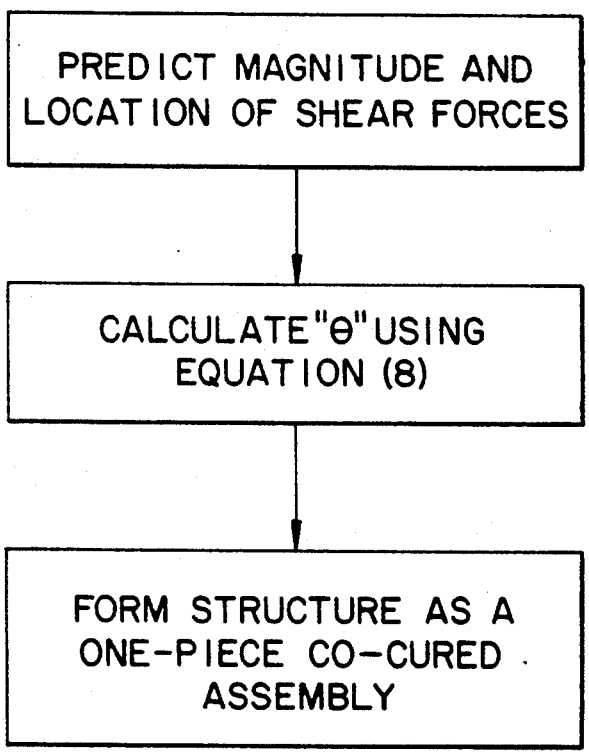
FIG. 9 is a flowchart illustrating a preferred method of manufacturing a load bearing structure according to a preferred embodiment of the invention.

As a result of the above geometry, it is possible to manufacture a graphite epoxy aircraft spoiler, and other load bearing composite structures, using a single curing step as follows, with reference to FIG. 9:

First, the focii and magnitude of shear forces $V_1$ and $V_2$ must be determined using conventional internal loads analysis, so that $\theta$ can be calculated according to equation 8. Once $\theta$ is obtained, the spoiler is formed with integral lower and upper covers and co-cured as a one-piece assembly. Finally, the attachment hardware may be added to complete the spoiler assembly.

Prediction of the shear forces may be accomplished in a conventional manner, using computer modeling and/or wind tunnel tests of various spoiler configurations. In addition, the curing process by which the spoiler is formed will be readily apparent to those skilled in the art in view of the above description.

Having thus described a specific example of the invention in terms of a graphite epoxy spoiler, it will nevertheless be appreciated that the principles of the invention are not to be limited to aircraft spoiler designs, but rather may have application in a variety of structures requiring shear attachments. In addition, while graphite epoxy is a preferred material, the principles of the invention may be of use in connection with other materials that are used in contexts in which a shear interface is required. In fact, it is anticipated that numerous variations of the invention will occur to those skilled in the art. Therefore, it is intended that the invention not be limited to the specific embodiment described, but rather that it be limited solely by the appended claims.

I claim:

1. A method of manufacturing a load bearing structure which during use is subjected to a shear force, comprising the steps of:
   (a) forming a core having a lower surface and an upper surface, and a spar connected to said lower and upper surfaces to form a continuous cover for said core;
   (b) determining a focus point of applied loads on said fitting; and
   (c) forming in said lower surface a fitting attachment flange for attaching a fitting to said structure and which is connected to said spar such that a tangent of said attachment flange converges with said upper surface at the focus point of applied loads on said fitting.

2. A method as claimed in claim 1, further comprising the step of curing said core, lower surface, upper surface, and spar simultaneously to obtain a one piece co-cured structure.

3. A method as claimed in claim 1, wherein said core, spar, and lower and upper surfaces are formed as a co-cured one piece structure having a honeycomb core sandwiched by said lower and upper surfaces.

4. A method as claimed in claim 3, wherein said attachment surface and spar are formed as a single continuous surface.

5. A method as claimed in claim 4, wherein said spar is formed at a non-zero angle relative to a principal plane of said lower surface.

6. A method as claimed in claim 1, wherein said step of forming said fitting attachment flange comprises the step of causing said tangent to converge at said upper surface at a convergence angle $\theta$ arranged to eliminate a vertical shear connection between said spar and said attachment flange.

7. A method as claimed in claim 6, wherein said angle of convergence θ of said tangent and said lower surface is defined by the equation $$\tan \theta = \frac{V_1 + 2V_2}{V_1\left(\frac{d_1}{d_3}\right) + \frac{T}{d_3} - 2(V_1 + 2V_2)\left(\frac{d_2}{d_3}\right)}.$$

where $V_2$ is a net shear force on said spar, $V_1$ is a net shear force on said upper surface, $d_2$ is one half a horizontal component of a spar depth, said component being parallel to a principal plane of said upper surface, and $d_3$ is a vertical component of the spar depth.

8. A load bearing structure manufactured according to the method of claim 1.

9. A load bearing structure which during use is subjected to a shear force, comprising:
a core; an upper surface; a lower surface including a fitting attachment flange for attaching a fitting to said structure; and a fitting attachment spar connecting the lower surface and the fitting attachment surface, wherein a tangent of said fitting attachment surface and said upper surface converge at a focal point of applied loads on said fitting.

10. A structure as claimed in claim 9, wherein said core, spar, lower surface, and upper surface form a co-cured one piece structure.

11. A structure as claimed in claim 9, wherein said core is a honeycomb core sandwiched by said lower and upper surfaces.

12. A structure as claimed in claim 11, wherein said lower surface and spar are parts of a single continuous surface.

13. A structure as claimed in claim 12, wherein said spar forms a surface oriented at a non-zero angle with respect to said upper surface.

14. A structure as claimed in claim 9, wherein an angle θ between said tangent of said attachment surface and said upper surface is given by the following equation:

$$\tan \theta = \frac{V_1 + 2V_2}{V_1\left(\frac{d_1}{d_3}\right) + \frac{T}{d_3} - 2(V_1 + 2V_2)\left(\frac{d_2}{d_3}\right)}.$$

where $V_2$ is a net shear force on said spar, $V_1$ is a net shear force on said upper surface, $d_2$ is one half a horizontal component of a spar depth, said component being parallel to a principal plane of said upper surface, and $d_3$ is a vertical component of the spar depth.

15. A structure as claimed in claim 9, wherein said structure is an aircraft wing spoiler.

16. A structure as claimed in claim 9, wherein said structure is formed of a composite material.

17. A structure as claimed in claim 16, wherein said composite material is graphite epoxy.

18. A structure as claimed in claim 9, further comprising means including at least one hinge fitting for pivotably attaching the structure to a second structure.

19. A structure as claimed in claim 18, wherein said hinge fitting is made of aluminum.

20. A structure as claimed in claim 18, wherein a number of said fittings is three.

21. A structure as claimed in claim 20, wherein the actuator/hinge attachment fitting includes a first portion arranged to be mounted on said second structure, a second portion oriented to be parallel to said attachment surface, and a third portion connecting said first and second portions, said third portion being oriented to be parallel to a surface of said spar.

22. A structure as claimed in claim 20, wherein each of said fittings includes means defining an aperture for mounting said structure on a pivot to form a hinge, and wherein one of said fittings further includes means defining an aperture for mounting an actuator to cause said structure to pivot about said hinge.

23. A structure as claimed in claim 22, wherein said first structure is a spoiler and said second structure is an aircraft wing having inboard and outboard portions.

24. A structure as claimed in claim 23, wherein an outboard one of said fittings has means including a pivot line extending normal to an axis of said hinge for eliminating side loads.

* * * * *